M. H. KERNAUL.
SHAFT COUPLINGS FOR MACHINERY.
No. 182,523.  Patented Sept. 26, 1876.
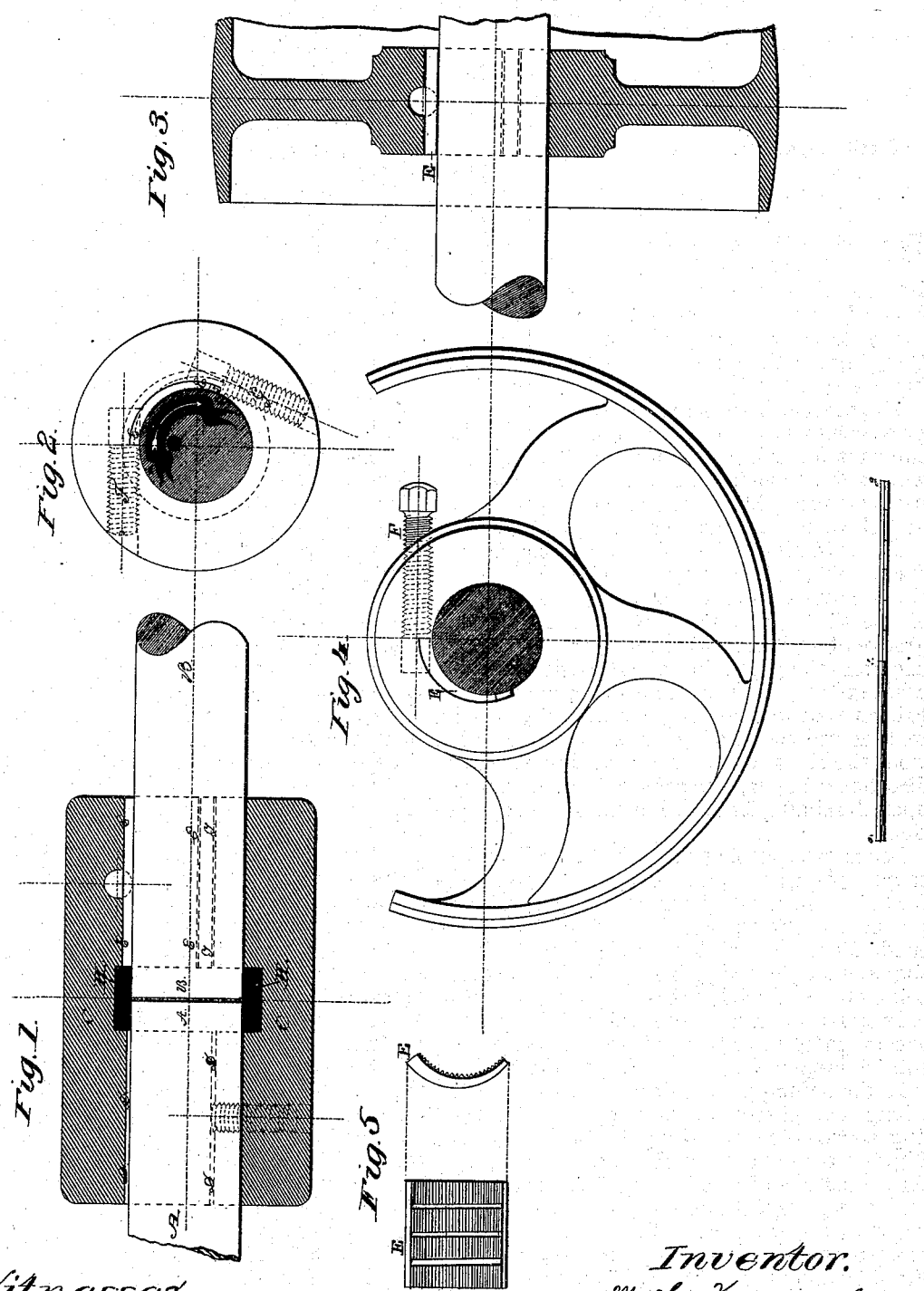
Witnesses:
John A. Ewin
A. M. Tanner
Inventor.
M. H. Kernaul
per Schied...
Attorney

UNITED STATES PATENT OFFICE.

MICHAEL H. KERNAUL, OF BERLIN, PRUSSIA.

IMPROVEMENT IN SHAFT-COUPLINGS FOR MACHINERY.

Specification forming part of Letters Patent No. 182,523, dated September 26, 1876; application filed August 23, 1876.

*To all whom it may concern:*

Be it known that I, MICHAEL HEINRICH KERNAUL, of the city of Berlin, in the Kingdom of Prussia, German Empire, have invented a certain new and Improved Shaft-Coupling for Machinery, of which the following is a specification:

The present invention relates to certain improvements in means for coupling driving or transmission shafts, and for securing pulleys, wheels, &c., to their shafts, whereby the coupled parts are firmly held in their relative positions, and all casual disengagement is prevented.

The invention consists in the employment, for coupling two shaft-sections, of a box or sleeve having an axial bore for the reception of the shafts, and provided with an arched groove at each end, with the deepest point of one groove opposite the shallowest point of the other groove, said grooves being each adapted to receive an arched or segmental wedge, which wedges are so contrived and arranged that when the shaft-sections are turned in opposite directions they will be caused to bind tightly upon the shafts, for securing the same in position.

Set-screws, passing through the shell of the coupling-box, are used to bear upon the wedges, for the purpose of adjusting the same, and for preventing the wedges from becoming loosened. For coupling wheels and pulleys to their shafts, a single wedge is employed, the same being also combined with an adjusting and retaining screw. The inner surface of the wedge is corrugated or roughened, so that the same will be prevented from slipping on the shaft.

In the accompanying drawings, Figure 1 is a longitudinal sectional view of a shaft-coupling constructed according to my invention. Fig. 2 is a cross-section of the same, taken on the dotted line of Fig. 1. Fig. 3 is a sectional view of a pulley, showing the manner of coupling the same to a shaft. Fig. 4 is an end view of a pulley, showing the shaft in cross-section. Fig. 5 exhibits the coupling-wedge in detail.

Letters A and B denote two shaft-sections, which are coupled together by means of the box or shell C and the wedges D E. The interior of the box is bored out axially, and the middle of the bore is made larger than the ends, as is shown at H, this being for the object hereinafter explained. The wedges D E are of an arched or segmental shape, and taper from one end to the other, and they are fitted in corresponding grooves or seats J, formed in the periphery of the mouth of the coupling-box, and are so shaped and fitted in said seats that when the shafts, after their insertion into the box, are turned from *a* to *b*, Fig. 2, the wedges are driven forward in an eccentric direction, and will hug or bind upon the shafts, in order to firmly retain the shafts in position. The two hollows or seats for the wedges D E are so arranged in relation to each other that the deepest point of one hollow lies in line with the highest point of the other hollow, so that the shafts must be turned in opposite directions for tightening the wedges. The hollows or seats for the wedges are a little longer or broader than the size of said wedges would require, so that the latter can be driven on to their full extent, and yet not take up the entire space of the hollows, as is shown in Fig. 2. The wedges are made of hardened steel, and their inner surface, or the surface in contact with the shaft, is made rough or corrugated, whereby the shafts are always endeavoring to drive the wedges forward, for tightening the same.

In order to prevent the loosening of the wedges by casual reverse movement of the shafts, I provide the screws F G, which pass through the shell of the coupling-box, and bear against the butt or larger end of the wedges. Said screws also serve as means for tightening the wedges by adjusting the same forward; and with the screws in position the disengagement of the coupling devices is not possible, for the wedges are so firmly retained that the coupled parts almost form a single piece.

In order to facilitate the making of the hollows or seats for the wedges, the box is made somewhat wider in the middle, by which a vacant space, H, Fig. 1, is formed.

In Figs. 3 and 4 is shown a method of coupling a pulley or wheel to its shaft, the principle being the same as in the shaft-coupling; but, instead of two wedges, I employ in this instance only one wedge, which is inserted into a hollow or seat formed in the hub of the wheel, having a screw passing through the same, and bearing against the wedge, for the object heretofore explained.

For separating the coupled transmission-shafts, it is only necessary to turn the two shafts simultaneously in opposite directions, after having drawn back the screws which bear upon the wedges. For disconnecting a pulley or wheel from its shaft, the screw is drawn back, and then the wedge can be loosened by giving it a slight stroke in the direction in which it points.

By my coupling system I avoid the many objections arising by the use of the ordinary nose-wedges employed for coupling shafts and pulleys, because, in my invention, there are no projecting points or noses to catch and carry along loose leather belts, and even garments of the workmen. The coupling itself requires but little time, as the pieces are put together and fastened without the use of a hammer. When nose-wedges are employed, however, much time is required for the exact centering of the shafts, and frequently these parts are damaged by the hammer-strokes. By dispensing with "wedge-planes," ("spring-grooves,") I maintain the shafts perfectly round at all times, and thus do not render them unfit for transmission purposes by planes or grooves.

I am aware of the existence of a shaft-coupling in which two shaft-sections are coupled within a sleeve by means of an eccentric clamp which extends the entire length of the sleeve, and is adjusted and retained by a wedge-key. The operation of this device is different from mine, because I use two independent wedges, which are tightened by turning the shaft-sections in opposite directions, and the general arrangement and construction of parts are also different.

Having thus described my invention, what I claim as new, and desire to secure by Letters Patent, is—

1. The coupling-sleeve provided with two independent grooves or seats, separated by a central chamber or enlargement of the sleeve-bore, and having the deepest point of one groove opposite the shallowest point of the other groove, in combination with the independent arc-shaped wedges and the shaft-sections, all constructed and relatively arranged to operate in the manner set forth.

2. The combination of the arc-shaped wedge, having a corrugated or roughened inner surface, and the retaining and adjusting screw, with the coupling sleeve or hub and the shaft, said screw passing radially through the sleeve or hub, and bearing upon the heel or large end of the wedge, as and for the purpose set forth.

In testimony whereof I have signed my name to this specification in the presence of two subscribing witnesses.

MICHAEL HEINRICH KERNAUL.

Witnesses:
JOHANNES FRANCK,
EDWARD P. MAC LEAN.